United States Patent [19]

Chevillot

[11] Patent Number: 4,597,208

[45] Date of Patent: Jul. 1, 1986

[54] CATTLE IDENTIFICATION TAG

[75] Inventor: Béatrix B. Chevillot, Vincennes, France

[73] Assignee: Chevillot, Paris, France

[21] Appl. No.: 640,921

[22] Filed: Aug. 14, 1984

[30] Foreign Application Priority Data

Aug. 25, 1983 [FR] France .................. 83 13722

[51] Int. Cl.[4] ............................................. G09F 3/00
[52] U.S. Cl. ...................................................... 40/301
[58] Field of Search ............... 40/300, 301, 302, 20 R

[56] References Cited

U.S. PATENT DOCUMENTS 3,947,930 4/1976 Martens et al. .................. 40/20 R
4,318,234 3/1982 Charles et al. ..................... 40/628

FOREIGN PATENT DOCUMENTS 56533 7/1982 European Pat. Off. ............. 40/301
2487634 2/1982 France ............................... 40/301
8102068 11/1982 Netherlands ...................... 40/301

Primary Examiner—John J. Wilson
Assistant Examiner—Cary E. Stone
Attorney, Agent, or Firm—Young & Thompson

[57] ABSTRACT

A cattle identification tag for attaching to the ear of an animal comprises a male part which passes through the ear and locks into an eyelet in a female part. The female part has a cap whose hardness is greater than that of the eyelet and has an annular open base which encircles the eyelet in the vicinity of and to the rear of a conical bearing surface of the eyelet which receives and locks a re-entrant conical shoulder of a head on the stem of the male part. The angle of taper of the conical shoulder and conical surface is approximately 45°. The stem has a narrowed region which becomes thinner and elongated in case of an authorized attempt to remove the male part.

13 Claims, 4 Drawing Figures

CATTLE IDENTIFICATION TAG

The present invention relates to a cattle identification tag comprising two parts which can be snapped into one another, namely a male part having a stem and a widened pointed head separated from the stem by a re-entrant conical shoulder, which stem is intended to pass through the animal's ear, and a female part having an eyelet closed by a cap and designed to be entered by the head, this head subsequently remaining locked because the said conical shoulder is retained against a complementary conical bearing surface of the eyelet.

The conical form of the shoulder of the head of the stem of the male part and of the corresponding bearing surface of the eyelet of the female part constitutes a tamperproofing means, intended to prevent fraud, whilst the cap closing the eyelet constitutes a means for preventing access, intended to reinforce the effectiveness of the tamperproofing means.

However tags of this type which have been proposed hitherto, however much they deter attempts at fraud, do not provide an absolute guarantee.

In fact, it has happened that defrauders try to recover tags at the slaughterhouse or directly from animals so as to put them on other animals. Such actions are fraudulent since they result in deception relating to the merchandise and amount to an infringement of sanitary regulations for a profitable purpose.

The subject of the present invention is a cattle identification tag of the type mentioned above, which makes it possible more effectively than in the past to prevent fraud or at least make it completely detectable.

According to the invention there is provided a cattle identification tag comprising a male part which can be snapped into a female part, the male part having a stem and a widened pointed head separated from the stem by a re-entrant conical shoulder, which stem is intended to pass through the animal's ear, and the female part having an eyelet closed by a cap and designed to be entered by the head which subsequently remains locked because the said conical shoulder is retained against a complementary conical bearing surface of the eyelet, and wherein the cap is of a material whose hardness is greater than that of the eyelet and has an annular open base which encircles the eyelet in the vicinity of and to the rear of the conical bearing surface, the angle of taper of which is approximately 45°.

As a result of this arrangement, the cap constitutes, because of its base, an extremely rigid reinforcement which does not prevent the head of the male part from entering it at the moment when the tag is closed, but which, once the tag is closed in this way, completely prevents the male part from being removed from the female part. This lock is made especially effective because the reinforcement provided by the base of the rigid cap is slightly to the rear of the conical bearing surface, this being in conjunction with an angle of taper of approximately 45°.

If a defrauder attempts to remove the cap for the purpose of unfastening a tag, he has to cut the cap, but in this case the defect becomes obvious. The defrauder can also try to destroy the cap by driving it into the point of the male part, but traces which are very easy to see result, and here again the fraud is perfectly evident. If the defrauder tries to separate the two parts of the tag by moving them away from one another, he cannot do this without damaging the cap, the base of which locks extremely firmly the eyelet in which the head of the male part is engaged. It will therefore be impossible for him to obtain, in this way, male and female parts separate from one another which are still perfectly intact and can be put back on another animal without any risk. If the defrauder succeeds in recovering one of the two parts of the tag without damaging it, whilst the other part of the tag is itself damaged, this action will be useless because separate appropriately numbered components allowing the defrauder to reconstruct a complete tag are not supplied in the trade.

Under these conditions, the tag according to the invention ensures virtually complete safety, making it possible to observe sanitary regulations and preventing any deception relating to the merchandise.

Excellent results are obtained when the SHORE hardness (International Standard ISO 868) of the eyelet is approximately 95A, whilst the SHORE hardness of the cap is approximately 74D.

The region of encirclement of the eyelet by the base of the cap is preferably located in a rearward extension of the conical bearing surface of the eyelet. This region of encirclement advantageously has a step-shaped profile.

This results in extremely effective locking of the head of the male part when the latter has been engaged into the eyelet of the female part.

The cap can be fastened to the eyelet by any suitable means, for example advantageously by fusion welding or adhesion welding along the region of encirclement.

In one embodiment, the cap is made transparent, thus making it possible to inspect the head of the male part. This cap can also be made opaque so as to conceal from possible defrauders the nature of the content of this cap and thus make it more hazardous for them to operate. The cap preferably has a small ventilation hole, the effect of which is to increase the hygienic performance of the tag.

According to another characteristic, the stem of the male part has an intermediate region which is narrowed so that it becomes thinner in an obvious way in any fraudulent attempt to draw it out. Under these conditions, if the defrauder tries to separate the male part from the female part by a pulling action, the stem of the male part is drawn out in such a way that it subsequently becomes impossible to snap it back into an eyelet of a female part again. The result can even be that the head is broken off from the stem of the male part. This head remains trapped in the female part, and here again the attempt at fraud is doomed to failure.

The head of the stem of the male part preferably incorporates at the front a hard nose anchored in the head by a tail having a collar, this tail being extended rearwards up to the vicinity of the re-entrant conical shoulder. The result of this arrangement is that it increases security against attempts at fraud. After the head of the male part has been introduced into the eyelet, the region of contact between the conical shoulder of the head of the male part and the conical bearing surface of the eyelet of the female part is as it were bordered both at the rear by the base of the rigid cap and at the front by the likewise rigid nose. Under these conditions, there is, therefore, a double-acting lock which makes any attempt at fraud practically impossible.

An embodiment of the invention is described below, by way of example, with reference to the accompanying drawings in which.

Figure 1:
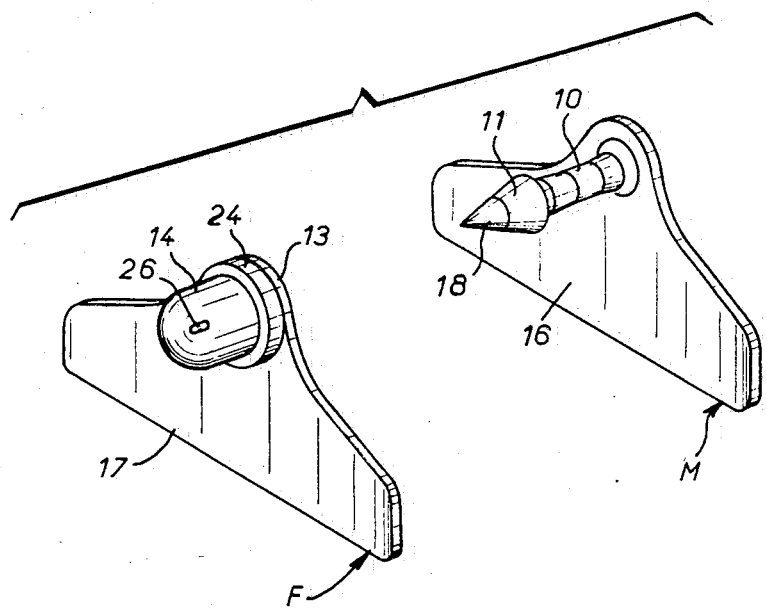
FIG. 1 is a perspective view of a tag according to the invention, showing the two parts of the tag separated.
Figure 2:
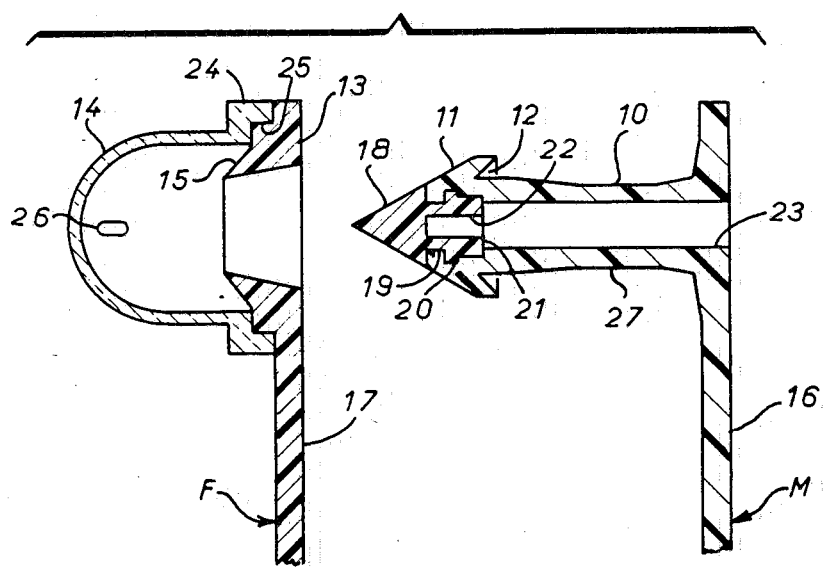
FIG. 2 is a sectional view of these two separate parts of the tag.
Figure 3:
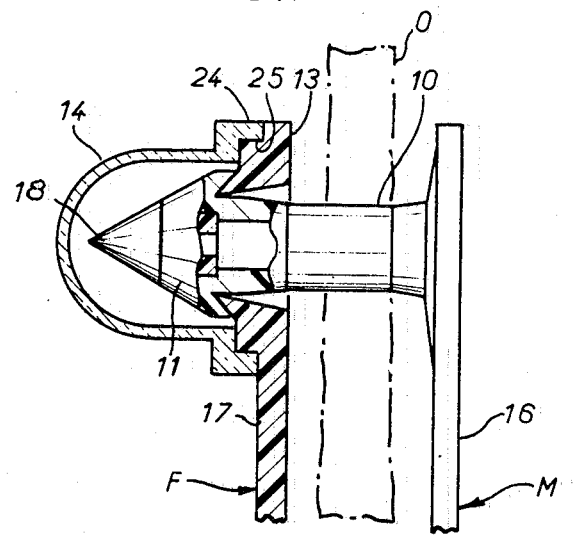
FIG. 3 is a view similar to FIG. 2, but after the two parts of the tag have been snapped into one another.

In the embodiment illustrated by way of example in FIGS. 1 to 4, a cattle identification tag comprises two parts M and F which can be snapped into one another, the male part M having a stem 10 and a head 11. This head 11 is pointed and widened and is separated from the stem 10 by a re-entrant conical shoulder 12. The stem 10 is intended to pass through the animal's ear O (FIG. 3). The other part F is female and has an eyelet 13 closed by a cap 14. The eyelet 13 is designed to be tranversed by the head 11 which subsequently remains locked because the conical shoulder 12 is retained against a complementary conical bearing surface 15 of the eyelet 13.

FIG. 3 shows the tag formed by the two parts F and M as it is attached to the animal's ear O with the head 11 locked in at 12, 15 behind the eyelet 13.

The cap surrounds the point 11 and prevents any risk of injury from this point 11, FIG. 3.

The male part M and the female part F respectively incorporate plates 16 and 17. The animal's identification signs are carried by one or both of the plates 16 and 17.

The male part M and the female part F of the tag are made of a relatively flexible plastic which allows good retention of the tag on the animal's ear O and, because of the relative flexability of the stem 10, prevents the tag from being torn off by bushes or fences. This plastic preferably has a SHORE hardness (International Standard ISO 868) of approximately 95A.

The head 11 of the stem 10 of the male part M, FIG. 2, incorporates a hard nose 18 at the front. This hard nose 18 is anchored in the head 11 by means of a tail 19 having a collar 20, which tail 19 extends rearwardly at 21 up to the vicinity of the re-entrant conical shoulder 12 of the head 11. This hard nose 18 made, for example, of plastics material or metal is intended to make it easier to penetrate into the animal's ear O. The tail 19 of the hard nose 18 incorporates a blind hole 22, and the stem 10 is hollow at 23 in order to allow the holes 22 and 23 to engage over a guide finger G of a suitable tool P, FIG. 4, used for attaching the tag.

As a further detail, the cap 14, which is of plastics material or of metal, may be made stainless by coating with plastic, and has a hardness greater than that of the eyelet 13.

Whereas the SHORE hardness of the eyelet is approximately 95A, as indicated above, the SHORE hardness of the cap is substantially greater and is selected at approximately 74D.

The cap 14 has an annular open base 24. This base 24 encircles the eyelet 13 in the vicinity of and slightly to the rear of the conical bearing surface 15.

The angle of taper of this conical bearing surface 15 and the angle of taper of the re-entrant conical shoulder 12 are the same, so as to allow excellent locking contact in the retention region 12-15. This angle is advantageously approximately 45°.

As can be seen in FIG. 2, the region of encirclement 25 of the eyelet 13 by the base 24 of the cap 14 is located in a rearward extension of the conical bearing surface 15 of the eyelet 13. This region of encirclement 25 has a step-shaped profile.

The cap 14 is fastened to the eyelet 13 by any suitable means, preferably by fusion welding or adhesion welding along the step-shaped region of encirclement 25.

The cap 14 is advantageously transparent, thus making it possible to inspect the head 11 of the male part M when the tag is attached to the animal's ear O. Alternatively, the cap 14 is made opaque to conceal from possible defrauders the appearance of the content of this cap. Moreover, the transparent cap 14 has a small ventilation hole 26 which is favourable for hygiene.

Figure 4:
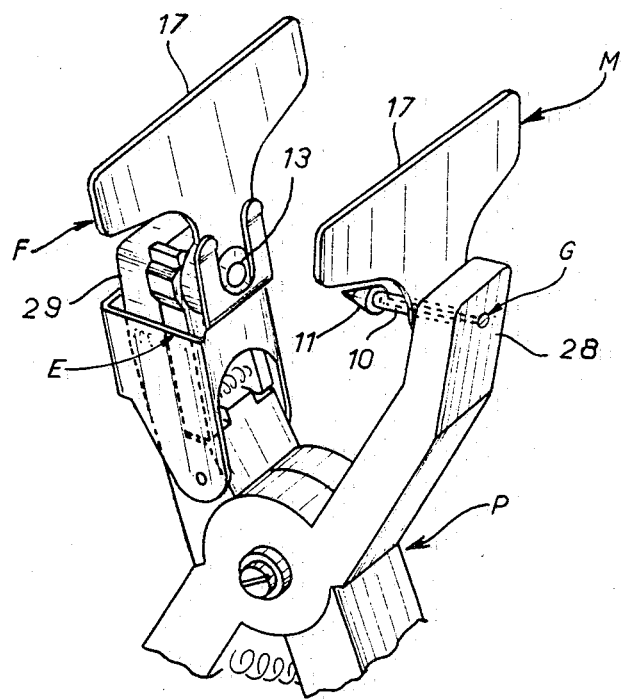
FIG. 4 shows in perspective pliers for attaching the tag to an animal's ear.

The cap 14 is intended to be gripped in a centered manner by an elastic clamp E of the tool P, FIG. 4, in order to attach the tag by means of the tool P.

The stem 10 of the male part M has an intermediate region 27 which is narrowed so that it becomes thinner in an obvious way, if there is any fraudulent attempt to draw it out.

To attach the tag to the animal's ear O, the tool P shown in FIG. 4 and in the form of pliers is used. The male part M and the female part F of the tag are placed on the guide finger G and in the elastic clamp E provided respectively on the two arms 28 and 29 of the pliers. The eyelet 13 is ready to receive the point 11 of the stem 10 of the male part M. It is sufficient, from that moment, to place the animal's ear O between the point 11 and the eyelet 13 and squeeze the tool by bringing together the arms 28 and 29. The point 11 and the stem 10 pass through the animal's ear O. The point 11 crosses the eyelet 13 and becomes locked in the latter, as shown in FIG. 3. Because of the invention, any fraudulent attempt to remove the tag from the animal's ear would fail. In fact, the bearing region at 12-15 is bordered both at the rear and at the front by rigid reinforcements: at the rear the rigid reinforcement consists of the base 24 of the cap 14, and at the front it consists of the tail 19 of the nose 18. Locking along the 45° conical regions at 12 and 15 is extremely effective.

Any attempt to separate the parts M and F of the tag by pulling will unavoidably result in an inopportune elongation of the stem 10 because of its narrowed region 27, before there is any risk that the head 11 will be detached from the eyelet. It is then impossible to put the male part back on another animal without the fraud being extremely obvious.

Moreover, if the defrauder tries to detach the head 11 from the eyelet 13 by sacrificing the cap so as to gain better access to the region 12-15, the damaged appearance of the cap 14 will, here again, make the fraud immediately apparent.

The tag according to the invention therefore provides a virtually absolute guarantee against attempts at fraud and thus makes it possible to observe sanitary regulations completely and prevents any deception relating to goods.

The particularly simple and convenient construction of the tag accordng to the invention will be appreciated, as will the way in which it can be attached very easily to the animal's ear O by means of the pliers P.

Of course, the invention is not limited to the embodiment described and illustrated, but encompasses alternative forms of its various elements and in its uses within the scope of the claims. In particular, if necessary, a reinforcing insert made of hard material can be embedded in the eyelet 13 in the vicinity of the conical bearing surface 15. Furthermore, it should be noted that the cap 14 can be made metallic, moulded in the eyelet and surrounded by a layer of plastic integral with the eyelet.

What is claimed is:

1. A cattle identification tag comprising a male part adapted to be snapped into a female part, said male part and said female part being at least in part of relatively flexible material, said male part having a stem and an enlarged pointed head at its forward end, said pointed head having a re-entrant conical shoulder at its connection to said stem, said head and stem being adapted to be inserted through an animal's ear, said female part including an eyelet having a conical bearing surface tapering to a front end and complementary to the conical shoulder on said male part, a rigid cap extending around said eyelet protruding to the front of said female part and defining an enclosure, said head being adapted to be inserted through said eyelet and received inside said enclosure defined by said cap, said conical bearing surface being adapted to cooperate with said conical shoulder to lock said male part in place in said female part subsequent to insertion, said cap being made of material harder than that of said eyelet, said cap having an open annular base encircling said eyelet in the vicinity of and rearwardly and radially outwardly of said conical bearing surface relative to the front end of said conical bearing surface, said base defining a rigid reinforcement of said eyelet for preventing rearward withdrawal of the male part, said cap being permanently fixed to said female part at said base, the angle of taper of said conical bearing surface being about 45°.

2. A tag according to claim 1, the Shore hardness of the material of said eyelet being about 95A and the Shore hardness of the material of said cap being about 74D.

3. A tag according to claim 1, wherein a rearward extension of the conical bearing surface, extending away from the tapered end of said conical bearing surface, cooperates with said annular open base of said cap.

4. A tag according to claim 3, wherein said rearward extension is stepped in cross section.

5. A tag according to claim 4, wherein said cap is bonded to said rearward extension.

6. A tag according to claim 4, wherein said annular open base of said cap is complementarily stepped for mating securement to said stepped rearward extension.

7. A tag according to claim 6, wherein said cap is bonded to said rearward extension.

8. A tag according to claim 3, wherein said cap is bonded to said rearward extension.

9. A tag according to claim 1, wherein said cap has a small ventilation hole.

10. A tag according to claim 1, wherein said cap is transparent.

11. A tag according to claim 1, wherein said cap is opaque.

12. A tag according to claim 1, wherein said head of said male part has a hard nose at its front end, said head having a rear tail with a collar for anchoring said hard nose in said head, the tail extending rearwardly to the vicinity of said re-entrant conical shoulder.

13. A tag according to claim 1, wherein said stem of said male part has a narrowed intermediate region which is adapted to become visibly elongated to indicate an unauthorized removal or attempt to remove the said male part from said female part.

* * * * *